(12) United States Patent
Bandari et al.

(10) Patent No.: US 9,740,527 B2
(45) Date of Patent: Aug. 22, 2017

(54) LOAD DISTRIBUTION OF LOGICAL SWITCH ROUTERS IN A DISTRIBUTED SYSTEM

(71) Applicant: Lenovo Enterprise Solutions (Singapore) Pte. Ltd., Singapore (SG)

(72) Inventors: Sreenath Bandari, Santa Clara, CA (US); Vipin K. Garg, Sunnyvale, CA (US); Keshav G. Kamble, Fremont, CA (US); Dar-Ren Leu, San Jose, CA (US); Vijoy A. Pandey, San Jose, CA (US); Immanuel Rahardja, Fremont, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 554 days.

(21) Appl. No.: 14/270,626

(22) Filed: May 6, 2014

(65) Prior Publication Data

US 2015/0324238 A1    Nov. 12, 2015

(51) Int. Cl.
*G06F 9/50* (2006.01)
*G06F 13/40* (2006.01)
*G06F 11/14* (2006.01)
*H04L 12/24* (2006.01)
(Continued)

(52) U.S. Cl.
CPC .............. *G06F 9/50* (2013.01); *G06F 9/5083* (2013.01); *G06F 11/14* (2013.01);
(Continued)

(58) Field of Classification Search
CPC . G06F 9/50; G06F 13/40; G06F 11/14; G06F 9/5083; G06F 13/4022; G06F 11/1464; G06F 11/3433; G06F 11/2005; G06F 11/2097; G06F 2209/5022; H04L 12/4641; H04L 67/1002; H04L 41/0893; H04L 43/0817; H04L 47/125
See application file for complete search history.

(56) References Cited

U.S. PATENT DOCUMENTS 6,944,785 B2 *   9/2005   Gadir ................... G06F 11/2005
                                                                  714/4.11
7,178,052 B2 *   2/2007   Hebbar ................... H04L 45/00
                                                                  379/221.04
(Continued)

*Primary Examiner* — Benjamin Wu
(74) *Attorney, Agent, or Firm* — Zilka-Kotab, P.C.

(57) ABSTRACT

A tool for supporting load distribution across one or more logical switch routers in a distributed system. The tool includes a first software module configurable to launch and monitor one or more application processes within the one or more logical switch routers in the distributed system. The tool includes a second software module configurable to manage a plurality of system information for the one or more logical switch routers in the distributed system. The tool includes a third software module configurable to control and manage a plurality of system resources in the distributed system. The tool includes a fourth software module configurable to control and manage a plurality of physical ports and a plurality of virtual ports in the distributed system. The tool includes a fifth software module configurable to manage a plurality of load distribution policies for the one or more logical switch routers in the distributed system.

15 Claims, 4 Drawing Sheets

(51) Int. Cl.
  H04L 12/46 (2006.01)
  H04L 29/08 (2006.01)
  *H04L 12/803* (2013.01)
  *H04L 12/26* (2006.01)
  *G06F 11/20* (2006.01)
  *G06F 11/34* (2006.01)

(52) U.S. Cl.
  CPC .......... G06F 11/1464 (2013.01); G06F 13/40 (2013.01); G06F 13/4022 (2013.01); H04L 12/4641 (2013.01); H04L 41/0893 (2013.01); H04L 67/1002 (2013.01); *G06F 11/2005* (2013.01); *G06F 11/2097* (2013.01); *G06F 11/3433* (2013.01); *G06F 2209/5022* (2013.01); *H04L 43/0817* (2013.01); *H04L 47/125* (2013.01)

(56) References Cited

U.S. PATENT DOCUMENTS

| | | | | |
|---|---|---|---|---|
| 8,687,638 B2* | 4/2014 | Ee | ........................ | H04L 12/2697 370/351 |
| 8,767,722 B2* | 7/2014 | Kamble | ................ | H04L 49/356 370/360 |
| 8,817,620 B2* | 8/2014 | Koponen | ............ | H04L 12/4633 370/235 |
| 8,837,493 B2* | 9/2014 | Casado | ................ | H04L 12/4633 370/395.53 |
| 8,873,398 B2* | 10/2014 | Kempf | .................. | H04W 24/02 370/216 |
| 9,021,459 B1* | 4/2015 | Qu | ............................ | G06F 8/65 710/33 |
| 2008/0008202 A1* | 1/2008 | Terrell | ................ | H04L 12/5693 370/401 |
| 2012/0287785 A1* | 11/2012 | Kamble | ................ | H04L 49/356 370/230.1 |
| 2013/0060929 A1 | 3/2013 | Koponen et al. | | |
| 2013/0211549 A1 | 8/2013 | Thakkar et al. | | |
| 2014/0229605 A1* | 8/2014 | Besser | .................... | H04L 43/12 709/224 |
| 2014/0241247 A1* | 8/2014 | Kempf | ................ | H04L 12/4633 370/328 |
| 2015/0009804 A1* | 1/2015 | Koponen | ............ | H04L 41/0695 370/219 |
| 2015/0085694 A1* | 3/2015 | Agarwal | ................ | H04L 43/04 370/253 |
| 2015/0124622 A1* | 5/2015 | Kovvali | ............ | H04W 28/0215 370/236 |

* cited by examiner

LOAD DISTRIBUTION OF LOGICAL SWITCH ROUTERS IN A DISTRIBUTED SYSTEM

FIELD OF THE INVENTION

The present invention relates generally to network virtualization, and more particularly to load distribution of logical switch routers in a distributed system.

BACKGROUND OF THE INVENTION

In computing, network virtualization is a method used to combine hardware and software network resources and network functionality into a single, software based administrative platform, known as a virtual network. Network virtualization is achieved through software and services that allow the sharing of storage, bandwidth, applications, and other network resources. The technology utilizes a method similar to the virtualization process used to simulate virtual machines within physical computers (i.e., server virtualization). A virtual network treats all hardware and software in the network as a single collection of resources, which can be accessed regardless of physical boundaries. In simple terms, network virtualization allows each authorized user to share network resources from a single computer.

Network virtualization facilitates customization and ease of network use. Virtualization can provide customized access that allows administrators to allocate critical network services, such as bandwidth throttling and quality of service (QoS). It can also provide consolidation by allowing a multitude of physical networks to be combined into a single virtual network, allowing for streamlined and simplified management.

In the last decade, networking systems are designed such that there is a management card and multiple line cards. In these designs, management cards are seen as a master of the device, and line cards are seen as members. Networking software shares a similar design. The portion of the networking software that runs on the management card is commonly known as control plane software. Control plane software is considered the intelligence of the networking device, as its performance is directly proportional to the computer power available on the master card and bandwidth between the line cards and management card.

SUMMARY

Aspects of the present invention disclose a method, system, and computer program product for supporting load distribution across one or more logical switch routers in a distributed system. The computer system includes a first software module configurable to launch and monitor one or more application processes within the one or more logical switch routers in the distributed system. The computer system includes a second software module configurable to manage a plurality of system information for the one or more logical switch routers in the distributed system. The computer system includes a third software module configurable to control and manage a plurality of system resources in the distributed system. The computer system includes a fourth software module configurable to control and manage a plurality of physical ports and a plurality of virtual ports in the distributed system. The computer system includes a fifth software module configurable to manage a plurality of load distribution policies for the one or more logical switch routers in the distributed system.

DETAILED DESCRIPTION

Figure 1:
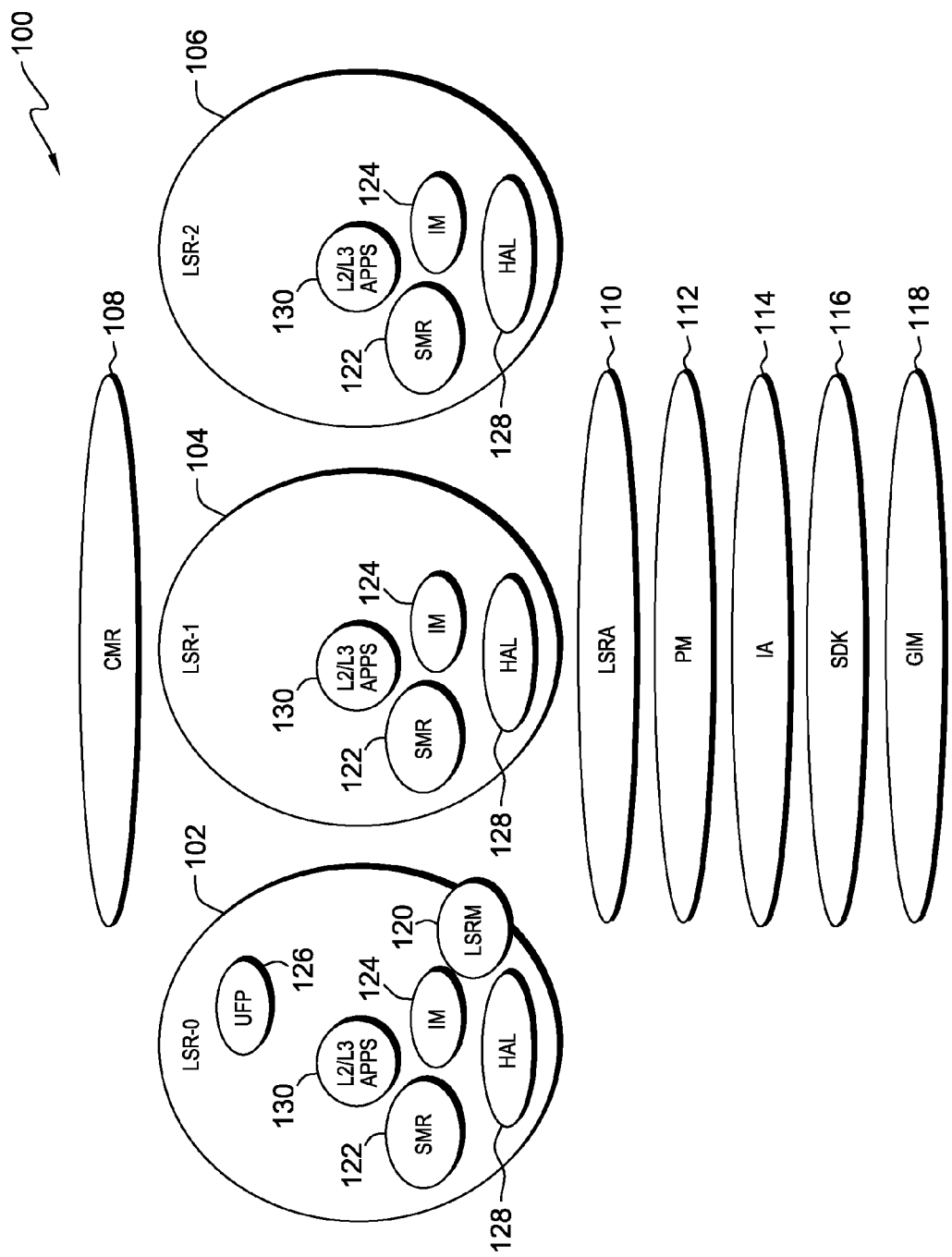
FIG. 1 illustrates a logical switch router (LSR) architecture within a data processing system, generally designated 100, in accordance with an embodiment of the present invention.

Embodiments of the present invention recognize that in a traditional logical switch router (LSR) system, logical partitions (LPs) operate on a single member, depending on the processing power and memory of the single member, even when more than one member (with available resources) exists in the LSR system, and as such, power and memory strains arise due to the lack of scalability.

Embodiments of the present invention provide the capability to scale a LSR system to avoid memory and CPU issues that arise when the number of members (switches) and LPs increase in the LSR system by distributing, based on software defined policies, LPs to available members in the LSR system to fully utilize the computing and memory resources available.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to Figures. FIG. 1 illustrates a logical switch router (LSR) architecture within a data processing system, generally designated 100, including a default logical switch router (LSR-0) 102, multiple non-default logical switch routers (LSR-1, LSR-2, etc.), such as LSR-1 104 and LSR-2 106, a configuration, management, and reporting client (CMR) 108, a logical switch router agent (LSRA) 110, a port manager (PM) 112, an interface agent (IA) 114, a software development kit (SDK) 116, a global index manager (GIM) 118, and a logical switch router manager (LSRM) 120.

In the exemplary embodiment, LSR-0 102 is an administrative logical switch router initially created by the networking system. LSR-0 102 cannot be deleted, and is responsible for managing non-default logical switch routers, such as LSR-1 104 and LSR-2 106. In the exemplary embodiment, the LSR environment is port/virtual port (vport) based, such that each port/vport can belong to only one LSR. All physical ports belong to LSR-0 102 until assigned to one or more non-default logical switch routers, such as LSR-1 104 and LSR-2 106. Initially, vports will not be present in the LSR environment. Vports are created by user configuration or via protocol negotiation.

In the exemplary embodiment, LSR-0 102 includes LSRM 120, a key process, operating on the master (as well as the backup) switch, responsible for LSR management, including hardware resource (e.g., port) assignment and management, a service manager (SMR) 122, a software module responsible for launch and monitoring of software processes, CMR 108, a command line interface responsible for user management of LSRs and processing user requests, an interface manager (IM) 124, a universal fiber port (UFP) 126, a hardware abstraction layer (HAL) 128, and L2 and L3 level applications (apps) 130. On the data plane, there is no direct communication between two LSRs on the same switch. Communication between two LSRs on the same switch is possible through external connectivity.

In the exemplary embodiment, SMR 122 is one instance per LSR. SMR 122 launches all software processes with each LSR via a configuration file associated with each process (e.g., application). In each LSR, processes can be launched automatically or launched by user configuration, i.e., CMR 108 signals SMR 122 when a user request is issued. SMR 122 launches processes as defined by the configuration file associated with the process. For example, if a process is implemented in a distributed way, and is launched per user configuration, SMR 122 sends the request to all other switches to launch the process in a particular LSR. Policies for monitoring and restart are defined per process.

In the exemplary embodiment, IM 124 is a software module capable of handling logical interface (LIF) related management. A LIF can represent a physical interface, a virtual interface, a port-channel, a routed virtual interface (RVI), a loopback, etc. A LIF database in shared memory (not shown) is maintained in IM 124. In the exemplary embodiment, one instance of IM 124 operates within each LSR in the LSR environment.

In the exemplary embodiment, UFP 126 is a universal arbitrated fiber port used to communicate with and connect to ports or other devices included within a LSR system.

In the exemplary embodiment, HAL 128 is a software module responsible for hardware programming in the LSR environment. HAL 128 includes a set of routines that emulate platform specific details that provide other software modules and applications access to hardware resources.

In the exemplary embodiment, L2 and L3 applications (apps) 130 include a plurality of L2 and L3 level applications that support graceful shutdown (i.e., all resources are freed, such as those indices allocated through GIM 118, and the hardware resources underpinning the control, data, and management planes are cleaned up before the application terminates). Apps 130 support a restart capability to provide high availability (HA) functionality (i.e., capability to back up and restart if failure occurs).

LSR-1 104 and LSR-2 106 are non-default LSRs created by a default LSR, such as LSR-0 102.

In the exemplary embodiment, the LSR environment includes hardware support (e.g., VRF, LN support on FDB, etc.) for traffic isolation between different LSRs on the data plane.

LSRA 110 is a software component functioning as an agent of LSRM 120 on every switch. LSRA 110 is a global process responsible for set up of the LSR environment on the control plane (such as jail and network namespace) of each switch. In the exemplary embodiment, LSRA 110 launches SMR 122 for each LSR, once the LSR is created.

PM 112 is a software module responsible for port management. PM 112 manages physical port and virtual port (i.e., channel) assignment in the LSR environment. A port database in shared memory (not shown) is maintained in PM 112. PM 112 is responsible for index assignment for hardware resources, such as LAG, multicast, spanning-tree-instance, etc., and is also responsible for enforcement of hardware resource policies for each LSR, such as LSR-1 104 and LSR-2 106. PM 112 is a global process with each switch having only one instance of PM 112 operating on it.

IA 114 is a software module responsible for managing mapping between logical interfaces (LIFs) and hardware ports. IA 114 is a global process with each switch having only one instance of IA 114 operating on it.

SDK 116 is a software module responsible for software development of the network chips in the LSR environment. SDK 116 is a global process with each switch having only one instance of SDK 116 operating on it.

GIM 118 is a software module responsible for index assignment for hardware resources such as LAG, multicast, spanning-tree-instance, etc. GIM 118 manages enforcement of hardware resource polices for one or more LSRs in the LSR system. GIM 118 is a global process with each switch having only one instance of GIM 118 operating on it.

LSR-0 102, LSR-1 104, and LSR-2 106 include multiple processes operating locally on each LSR.

Figure 2:
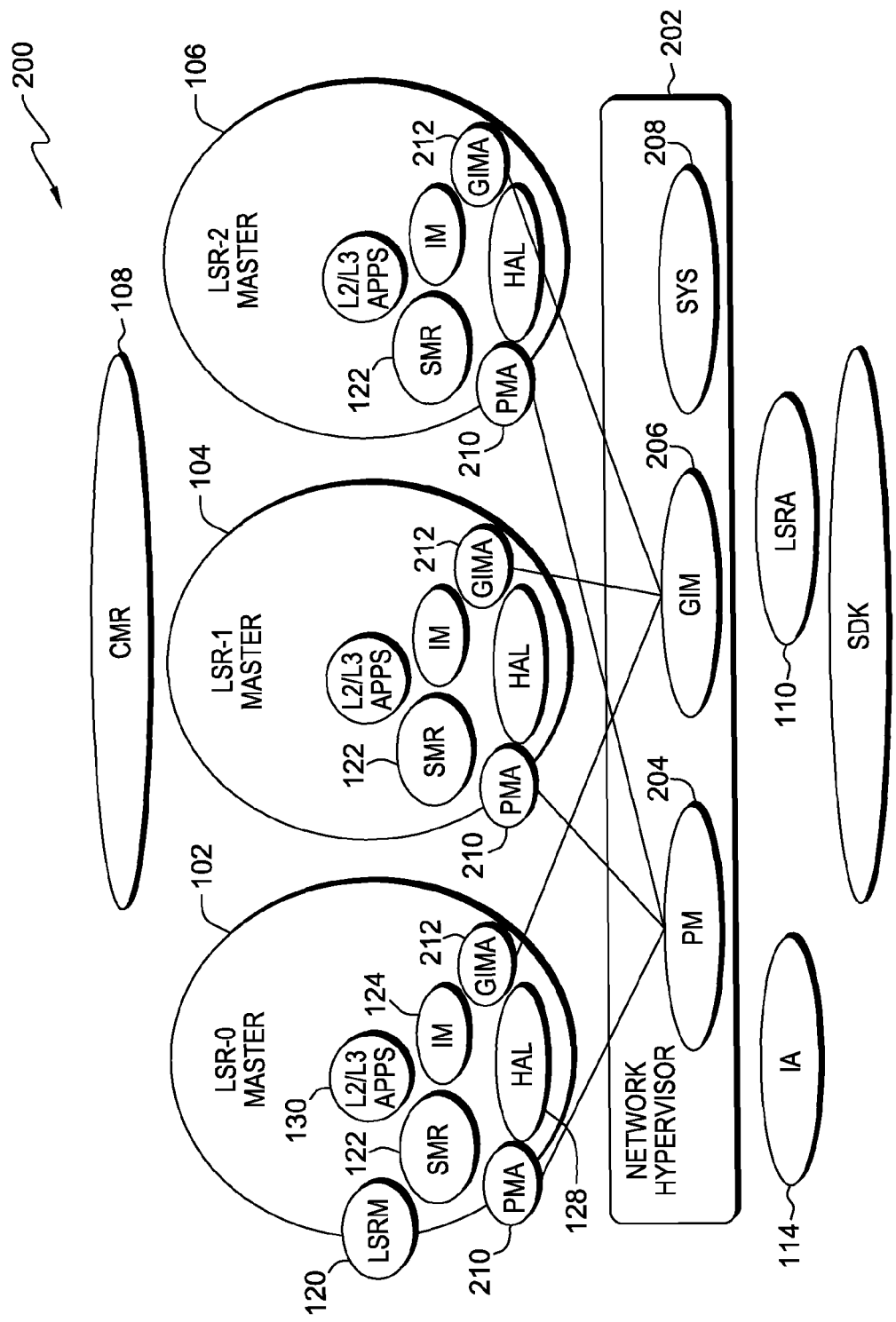
FIG. 2 is a functional block diagram illustrating architecture to support policy based LSR load distribution in an LSR system, in accordance with an embodiment of the present invention.

FIG. 2 is a functional block diagram, generally designated 200, illustrating architecture to support policy based LSR load distribution in an LSR system, in accordance with an embodiment of the present invention.

In the exemplary embodiment, network hypervisor 202 is a software module presenting a logical view of the LSR system and available resources, including, but not limited to, global modules and device drivers, such as port manager (PM) 204, global index manager (GIM) 206, and system manager (SYS) 208. Global modules present a unified view of the LSR system, and device drivers enable boot-up of the LSR system.

In the exemplary embodiment, SYS 208 is a software module for stacking switches (e.g., master, backup, and member) within the LSR system. SYS 208 determines switch roles for the LSR system, as well as for individual LSRs. SYS 208 consists of a system manager (operating on every switch) and a master system manager (operating on the master switch). In the exemplary embodiment, the system manager is a software module operating locally on each switch (i.e., one system manager per switch). The system manager sends system information, including, but not limited to, CPU usage, memory utilization, and process states, collected from a platform manager (not shown) and SMR 122, to one or more software modules, including LSRM 122 in LSR-0 102. The system managers on all local switches work together to determine a master controller of the LSR system. The system manager notifies other modules on local switches of updates related to new switch roles (e.g., master, backup, and member), including, but not limited to, local switch IDs, master switch IDs, and backup switch IDs.

In the exemplary embodiment, the master system manager is a software module operating on the master controller of the whole LSR system. The master system manager collects run-time states and system information, such as CPU usage, memory utilization, process states, etc., for all switches in the LSR system, and sends the run-time system information to all other LSR system managers periodically. The master system manager determines the master controller of the whole system (i.e., the master controller of the default LSR, such as LSR-0 102). Upon receipt of a user request from LSRM 120 in LSR-0 102, the master system manager determines the master controller, as well as back up controller candidates for non-default LSRs. In the exemplary embodiment, LSR system manager is a software module operating on the master controller of one or more LSRs in the LSR system. The LSR system manager receives run-time system information for all switches in the LSR system from the master system manager. Upon receipt of user requests from SMR 122, such as SMR 122 in LSR-1 104, LSR system manager determines the backup controller for LSR-1 104. Upon receipt of user requests from SMR 122, such as SMR 122 in LSR-2 106, LSR system manager determines whether a switch-over of the master switch role should be triggered for LSR-2 106. LSR system manager sends backup controller and switch-over decisions to the master system manager and all other system managers.

In the exemplary embodiment, GIM 206 is a software module responsible for resource allocation of the LSR system (i.e., what resources are allocated to what LSR), and resource assignment for one or more LSRs in the LSR system. GIM 206 operates on the master controller of the LSR system. GIM 206 manages system resources in the hardware for the LSR system. GIM 206 communicates to a global index manager agent (GIMA) 212 on one or more LSRs in the LSR system how to allocate system resources. System resources are allocated to one or more LSRs in the LSR system through the utilization of a separate range of hardware resources within one or more LSRs, such that GIMA 212 can assign system resources without having to request assignments from GIM 206. In another embodiment, where a separate range of hardware resources within one or more LSRs does not exist, GIM 206 may respond to a resource assignment request from GIMA 212. GIM 206 retains a record of all resources allocated for one or more LSRs in the LSR system, as well as resource utilization by one or more LSRs in the LSR system. GIM 206 syncs its database to a backup GIM (i.e., the backup GIM operating on the backup controller of the LSR system) for high availability (HA) purposes.

In the exemplary embodiment, GIMA 212 is a software module operating on the master controller of a LSR in the LSR system. GIMA 212 receives information related to system resources allocated for a local LSR in the LSR system. GIMA 212 responds to requests from applications within a local LSR for resource assignment. GIMA 212 provides the capability to relay a resource assignment request to GIM 118 for resolution. GIMA 212 sends a resource utilization summary for a local LSR to GIM 118 periodically. GIMA 212 syncs its database to a backup GIMA 212 in the LSR it operates in for HA purposes.

PM 204 is a software module responsible for port management of the LSR system and event handling (i.e., PM 204 interacts with other modules within one or more LSRs in the LSR system). PM 204 operates on the master controller of the LSR system. PM 204 manages one or more ports, including physical and virtual ports (channels) for the LSR system. Upon receipt of a request from LSRM 120, PM 204 performs port movement across one or more LSRs in the LSR system by coordinating with port manager agent (PMA) 210 in one or more LSRs. PM 204 syncs its database to a backup PM 204 operating on the backup controller of the LSR system for HA purposes.

In the exemplary embodiment, PMA 210 operates on one LSR on the master controller of that LSR. PMA 210 manages one or more ports, including physical ports and channels for one LSR in the LSR system. PMA 210 communicates with IM 124, UFP 126, and other applications within the LSR it operates in for event passing (e.g., physical port and virtual port assignment). In another embodiment, where an event (i.e., an assignment) needs to pass across a LSR boundary (i.e., from LSR-1 104 to LSR-2 106), the event passes via PM 112 (i.e., the event passes from PMA 210 in LSR-1 104 to PM 112, and then passes to PMA 210 in LSR-2 106 for handling). PMA 210 communicates with PM 112 to allocate ports to one or more LSRs in the LSR system. PMA 210 syncs its database to a backup PMA 210 in the LSR it operates in for HA purposes.

In the exemplary embodiment, LSRM 120 operates on the master controller of the LSR system (i.e., the default LSR, such as LSR-0 102). LSRM 120 stores user configured LSR load distribution policies gathered from CMR 108. LSRM 120 sends LSR load distribution policies to SYS 208 on the master controller. When a new LSR is created, LSRM 120 coordinates with SYS 208 on the master controller to determine the master controller for the new LSR, and one or more backup controller candidates for the new LSR. When a port, including a physical port or channel, is allocated to a new LSR, LSRM 120 communicates with PM 204 for the movement of the port. LSRM 120 syncs its database to a backup LSRM 120 (on the backup controller) for HA purposes. When LSRM 120 crashes, a restarted LSRM 120 restores its original states from the local database. For example, where the master switch fails, the backup switch will take over the master role and become the master switch. The backup LSRM 120 becomes the new LSRM 120, and the new LSRM 120 can sync its database to a new backup LSRM 120 on the master controller for future HA purposes. By backing up its database, LSRM 120 provides service restart, active-stand by, and failure containment. For example, were LSRM 120 on LSR-0 102 to fail, the LSR software architecture provides for containment of the failure, and as such, a switch-over of LSR-0 102 to its backup does not impact other LSRs in the system, such as LSR-1 104 and LSR-2 106.

Figure 3:
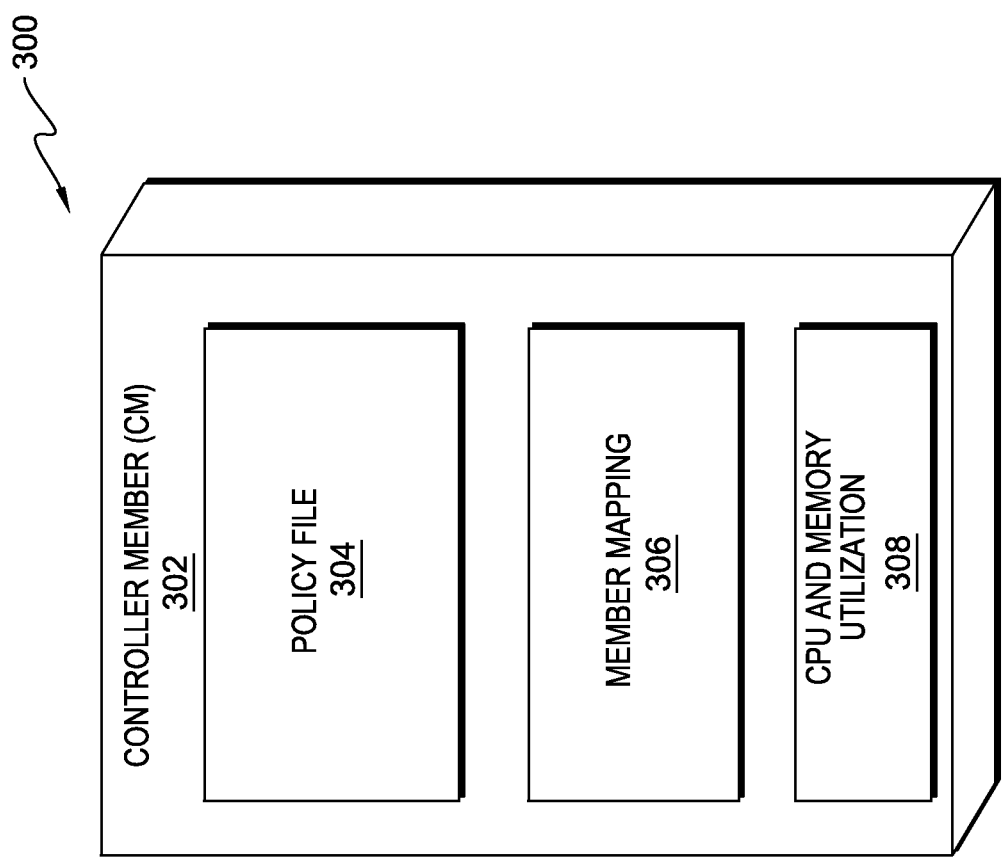
FIG. 3 depicts a block diagram of a controller-member in a LSR system, in accordance with an embodiment of the present invention.

FIG. 3 depicts a block diagram, generally designated 300, of a controller-member in a LSR system. In the exemplary embodiment, controller-member (CM) 302 is a software module responsible for maximizing CPU and memory usage within a LSR system, without impacting service reliability, by utilizing LSR system information to determine load distribution for one or more LSRs in the LSR system based on user configurable policies.

In the exemplary embodiment, when the LSR system powers up, the LSR system defines one member from one or more members in the LSR system (i.e., from the one or more members in the distribution of the LSR system) as CM 302. CM 302 includes system information relating to the one or more members in the LSR system, including, but not limited to, policy file 304, member mapping 306, and CPU and memory utilization 308. Each member in the LSR system periodically updates their system information with CM 302. CM 302 includes a policy file 304, a readable, user configurable, LSR creation policy file. Policy file 304 consists of rules governing how to distribute LSRs on the one or more members in the LSR system, to optimize CPU and memory resources. For example, a LSR creation policy file may include rule 1: if available_member_in_system <=2, Then create all LSR on same member; rule 2: if available_member_in_system >=(2*max_LSR_supported+1), then create each LSR on dedicated member. Creating LSRs on dedicated members allows CM 302 to take advantage of CPU and memory power available in the LSR system. CM 302 maintains a LSR to member mapping, within member mapping 306, which may be updated periodically, to reflect the layout of members in the LSR system. For example, LSR-1 104 may include member 1, member 2, and member 3. LSR-2 106 may include member 4, member 5, and member 6. In the event that one of more members passes to another LSR, CM 302 reflects such passing in the LSR in member mapping 306. In the exemplary embodiment, one or more members in the LSR system periodically report CPU and memory utilization to CM 302. CPU and memory utilization 308 in CM 302 contains CPU and memory utilization for the one or more members in the LSR system to determine potential opportunities in load distribution, such as where to launch a new LSR, where to pass members, etc., thereby creating a programmable and flexible system, adaptable to a user's needs.

Figure 4:
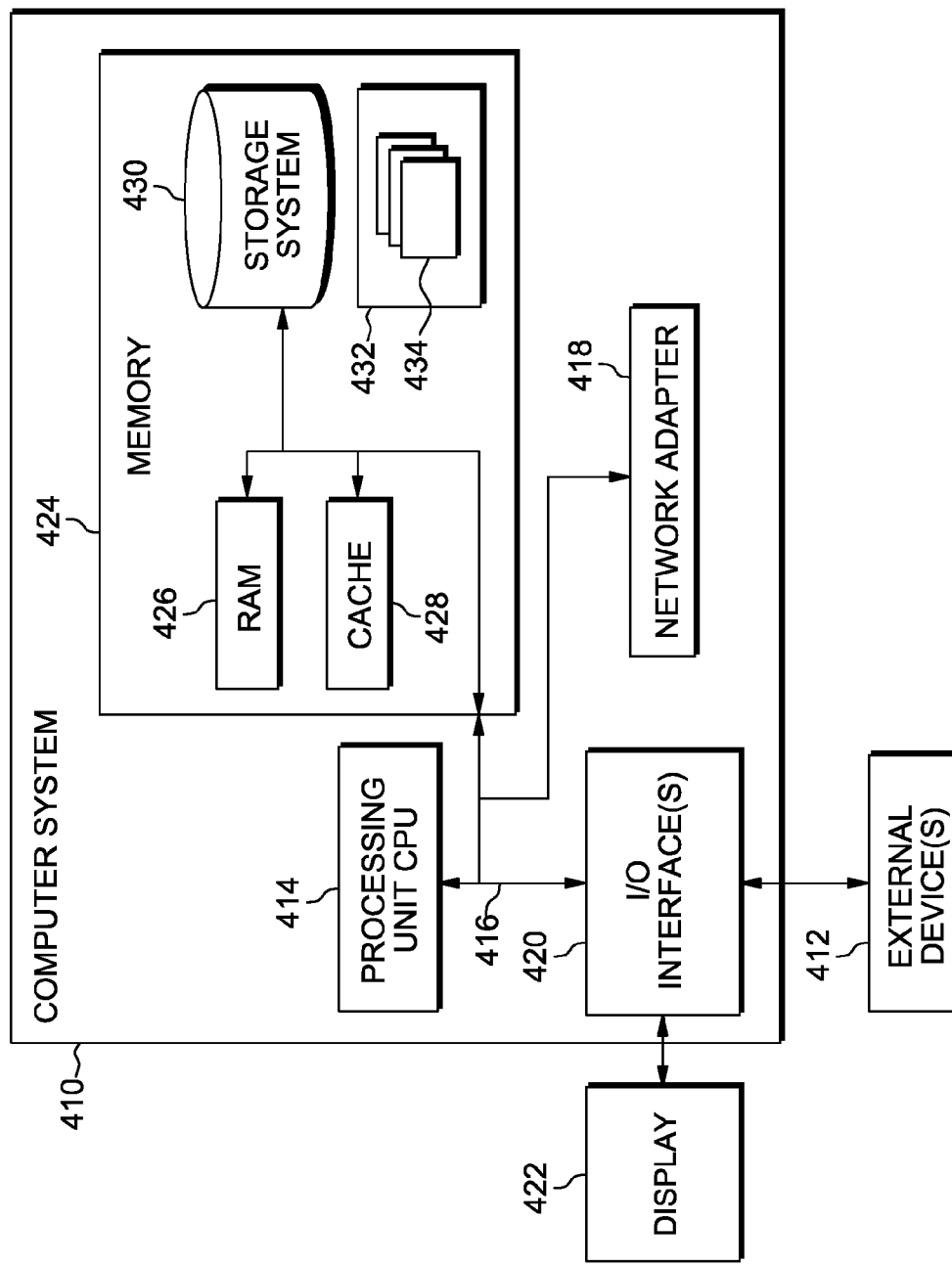
FIG. 4 depicts a block diagram of components of data processing system 100, in accordance with an illustrative embodiment of the present invention.

FIG. 4 depicts a block diagram of components of data processing system 100, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

Computer system 410, in data processing system 100, is shown in the form of a general-purpose computing device. The components of computer system 410 may include, but are not limited to, one or more processors or processing units 414, a system memory 424, and a bus 416 that couples various system components, including system memory 424 to processor 414.

Bus 416 represents one or more of any of several types of bus structures, including a memory bus or memory controller, a peripheral bus, an accelerated graphics port, and a processor or local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

System memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, system memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external devices 412 such as a keyboard, a pointing device, a display 422, etc. one or more devices that enable a user to interact with computer system 410, and any devices (e.g., network card, modem, etc.) that enable computer system 410 to communicate with one or more other computing devices. Such communication can occur via Input/Output (110) interfaces 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system having a logical switch architecture supporting load distribution across one or more logical switch routers in a distributed system, the computer system comprising:
   one or more computer processors;
   one or more computer readable storage media;
   program instructions stored on the one or more computer readable storage media for execution by at least one of the one or more computer processors, the program instructions comprising:
   a first software module configurable to launch and monitor one or more application processes within the one or more logical switch routers in the distributed system including processing a plurality of high availability policies for the one or more logical switch routers in the distributed system;

a second software module configurable to manage a plurality of run-time system information for the one or more logical switch routers in the distributed system, the second software module being configured to:
  determine a master controller for the one or more logical switch routers in the distributed system; and
  determine a backup controller for the one or more logical switch routers in the distributed system;

a third software module configurable to control and manage a plurality of system resources in the distributed system;

a fourth software module configurable to control and manage a plurality of physical ports and a plurality of virtual ports in the distributed system; and a fifth software module configurable to manage a plurality of load distribution policies for the one or more logical switch routers in the distributed system.

2. The computer system of claim 1, wherein the first software module configurable to launch and monitor the one or more application processes within the one or more logical switch routers in the distributed system is further configurable to perform one or more of the following:
  communicate to the second software module a plurality of run-time states for the one or more application processes within the one or more logical switch routers in the distributed system; and
  communicate to the second software module a critical event that triggers a failure in the master controller for one or more logical switch routers in the distributed system.

3. The computer system of claim 1, wherein the second software module configurable to manage the plurality of run-time system information for the one or more logical switch routers in the distributed system is further configurable to include a master system manager, a system manager, and a logical switch router system manager, wherein the master system manager operates on a master controller for the distributed system, the system manager operates on the one or more logical switch routers in the distributed system, and the logical switch router system manager operates on the master controller for the one or more logical switch routers in the distributed system.

4. The computer system of claim 3, wherein the second software module configurable to include the master system manager is further configurable to:
  collect the plurality of run-time system information communicated by the system managers of the one or more logical switch routers in the distributed system;
  send the plurality of run-time system information to the one or more logical switch router system managers operating on the master controller for the one or more logical switch routers in the distributed system; and
  determine the master controller for the distributed system.

5. The computer system of claim 3, wherein the second software module configurable to include the logical switch router system manager is further configurable to perform one or more of the following:
  determine a switch-over of a master role for the master controller for the one or more logical switch routers in the distributed system to the backup controller for the one or more logical switch routers in the distributed system; and
  communicate determinations of the backup controller for the one or more logical switch routers in the distributed system and the switch-over of the master role for the master controller to the master system manager and the one or more system managers for the one or more logical switch routers in the distributed system.

6. The computer system of claim 5, wherein the second software module configurable to include the system manager is further configurable to:
  send the plurality of run-time system information to the master system manager; and
  notify the one or more software modules in the distributed system of any new switch roles and a corresponding switch ID.

7. The computer system of claim 1, wherein the third software module configurable to control and manage a plurality of system resources in the distributed system is further configurable to include a master global index manager and one or more global index manager agents, wherein the master global index manager operates on the master controller of the distributed system and the one or more global index manager agents operates on the one or more master controllers of the one or more logical switch routers in the distributed system.

8. The computer system of claim 7, wherein the third software module configurable to include the master global index manager is further configured to:
  communicate to the one or more global index manager agents in the plurality of system resources allocated to the one or more logical switch routers in the distributed system;
  manage the plurality of system resources allocated to the one or more logical switch routers in the distributed system and their utilization; and
  sync a global index manager database to a backup global index manager operating on a backup controller.

9. The computer system of claim 7, wherein the third software module configurable to include the global index manager agent is further configured to perform one or more of the following:
  retrieve one or more system resources allocated for the one or more logical switch routers in the distributed system from the master global index manager;
  respond to a plurality of resource assignment requests from the one or more applications within the one or more logical switch routers in the distributed system;
  send a resource utilization summary for the one or more logical switch routers to the master global index manager periodically; and
  sync database to a backup global index manager agent.

10. The computer system of claim 1, wherein the fourth software module configurable to control and manage a plurality of physical ports and a plurality of virtual ports in the distributed system is further configurable to include a master port manager and one or more port manager agents, wherein the master port manager operates on the master controller of the distributed system and the one or more port manager agents operate on the master controller of the one or more logical switch routers in the distributed system.

11. The computer system of claim 10, wherein the fourth software module configurable to include the master port manager is further configurable to perform one or more of the following:
  control and manage the plurality of physical ports and the plurality of virtual ports in the distributed system;
  assign the plurality of physical ports and the plurality of virtual ports to the one or more logical switch routers in the distributed system; and sync database to a backup port manager operating on the backup controller of the distributed system.

12. The computer system of claim 10, wherein the fourth software module configurable to include the one or more port manager agents is further configurable to:
control and manage the plurality of physical ports and the plurality of virtual ports for the one or more logical switch routers in the distributed system;
communicate a plurality of physical port assignments and a plurality of virtual port assignments to the one or more applications for the one or more logical switch routers in the distributed system;
communicate port allocation for the plurality of ports for the one or more logical switch routers in the distributed system to the master port manager; and
sync database to a backup port manager agent.

13. The computer system of claim 1, wherein the fifth software module configurable to manage the plurality of load distribution policies for the one or more logical switch routers in the distributed system is further configurable to:
send the plurality of load distribution policies for the one or more logical switch routers in the distributed system to the second software module;
determine, in coordination with the second software module, the master controller for the one or more logical switch routers in the distributed system;
determine, in coordination with the second software module, the backup controller for the one or more logical switch routers in the distributed system;
send a request to assign one or more ports allocated to the one or more logical switch routers in the distributed system to the fourth software module; and
sync database to a backup fifth software module.

14. A computer system having a logical switch architecture supporting load distribution across one or more logical switch routers in a distributed system, the computer system comprising:
one or more computer processors;
one or more computer readable storage media;
program instructions stored on the one or more computer readable storage media for execution by at least one of the one or more computer processors, the program instructions comprising:
a first software module configurable to launch and monitor one or more application processes within the one or more logical switch routers in the distributed system;
a second software module configurable to manage a plurality of system information for the one or more logical switch routers in the distributed systems;
a third software module configurable to control and manage a plurality of system resources in the distributed system;
a fourth software module configurable to control and manage a plurality of physical ports and a plurality of virtual ports in the distributed system; and
a fifth software module configurable to manage a plurality of load distribution policies for the one or more logical switch routers in the distributed system,
wherein the fourth software module configurable to control and manage a plurality of physical ports and a plurality of virtual ports in the distributed system is further configurable to include a master port manager and one or more port manager agents, wherein the master port manager operates on a master controller of the distributed system and the one or more port manager agents operate on a master controller of the one or more logical switch routers in the distributed system,
wherein the fourth software module configurable to include the one or more port manager agents is further configurable to:
control and manage the plurality of physical ports and the plurality of virtual ports for the one or more logical switch routers in the distributed system;
communicate a plurality of physical port assignments and a plurality of virtual port assignments to the one or more applications for the one or more logical switch routers in the distributed system;
communicate port allocation for the plurality of ports for the one or more logical switch routers in the distributed system to the master port manager; and
sync database to a backup port manager agent.

15. A computer system having a logical switch architecture supporting load distribution across one or more logical switch routers in a distributed system, the computer system comprising:
one or more computer processors;
one or more computer readable storage media;
program instructions stored on the one or more computer readable storage media for execution by at least one of the one or more computer processors, the program instructions comprising:
a first software module configurable to launch and monitor one or more application processes within the one or more logical switch routers in the distributed system including communicating to the second software module a critical event that triggers a failure in the master controller for the one or more logical switch routers in the distributed system;
a second software module configurable to manage a plurality of run-time system information for the one or more logical switch routers in the distributed system, the second software module being configured to:
determine a master controller for the one or more logical switch routers in the distributed system; and
determine a backup controller for the one or more logical switch routers in the distributed system;
a third software module configurable to control and manage a plurality of system resources in the distributed system;
a fourth software module configurable to control and manage a plurality of physical ports and a plurality of virtual ports in the distributed system; and
a fifth software module configurable to manage a plurality of load distribution policies for the one or more logical switch routers in the distributed system.

* * * * *